G. MUELLER.
COFFEE AND TEA PERCOLATOR.
APPLICATION FILED FEB. 9, 1910.
967,813.
Patented Aug. 16, 1910.
2 SHEETS—SHEET 1.
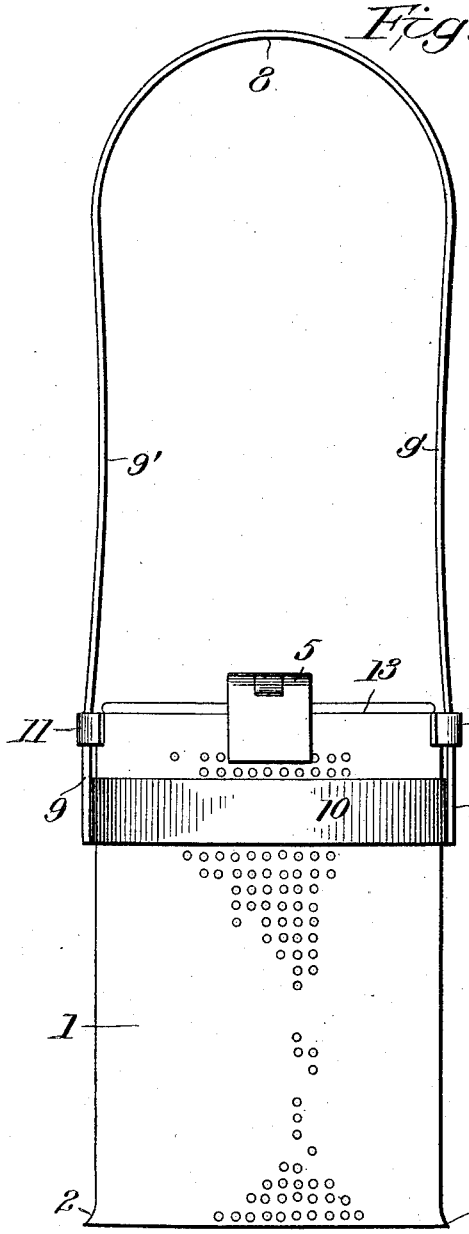
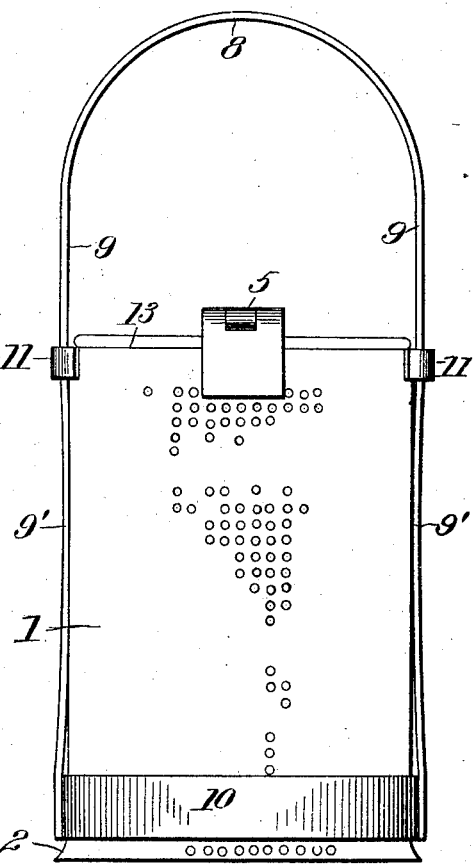

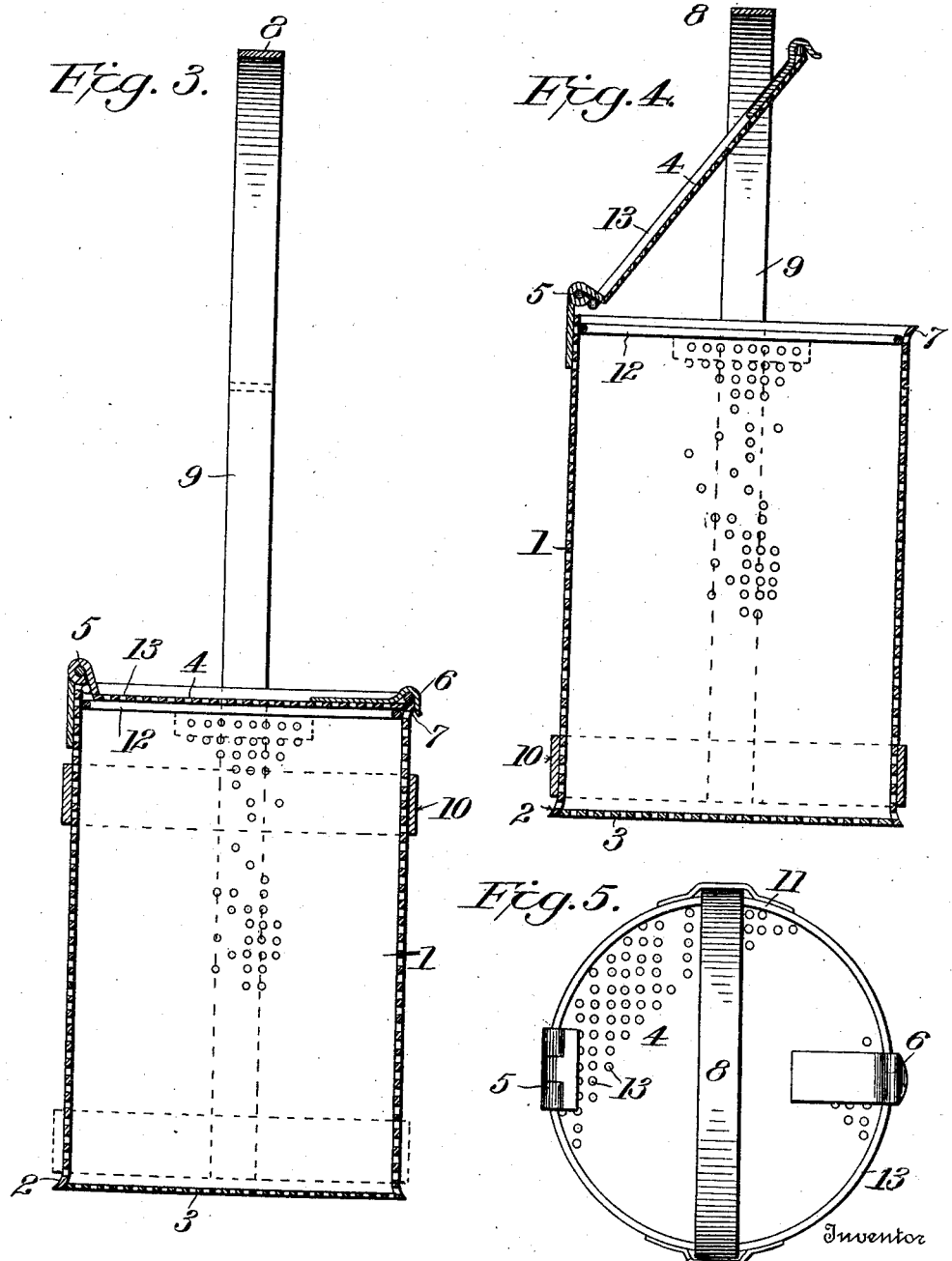

UNITED STATES PATENT OFFICE.

GEORGE MUELLER, OF SALT LAKE CITY, UTAH.

COFFEE AND TEA PERCOLATOR.

967,813.  Specification of Letters Patent.  Patented Aug. 16, 1910.

Application filed February 9, 1910. Serial No. 542,974.

*To all whom it may concern:*

Be it known that I, GEORGE MUELLER, a citizen of the United States, residing at Salt Lake City, in the county of Salt Lake and State of Utah, have invented certain new and useful Improvements in Coffee and Tea Percolators, of which the following is a specification.

This invention relates to coffee or tea percolators.

One object of the invention is to provide a device adapted to contain tea leaves or coffee grounds in a tea or coffee pot so that when the hot water is poured into the pot the leaves or grounds will not clog the spout of the pot and so as to obviate the necessity of employing a strainer to hang on the outside of the spout of the pot.

Another object of the invention resides in the provision of a percolator or filter for tea or coffee pots which is adapted to confine the tea leaves or coffee grounds to prevent the same from clogging parts of the pot and thereby affecting the taste of the beverage, the confinement of the leaves or grounds preventing the beverage from becoming gradually thick and bitter, and also enabling an easy cleaning of the pot and a ready removal of the leaves and grounds from the percolator or filter.

With the above and other objects in view, the present invention consists in the combination and arrangement of parts hereinafter more fully described, illustrated in the accompanying drawings, and particularly pointed out in the appended claims, it being understood that changes may be made in the form, proportion, size and minor details, without departing from the spirit or sacrificing any of the advantages of the invention.

In the drawings:—Figure 1 is a side elevation of the invention with the handle thereof elevated. Fig. 2 is another side elevation with the handle lowered. Fig. 3 is a longitudinal sectional view showing the handle raised in full lines and lowered in dotted lines. Fig. 4 is another vertical sectional view showing the top of the percolator raised. Fig. 5 is a top plan view.

Referring now more particularly to the accompanying drawings, the reference character 1 indicates the body of my improved percolator which is perforated throughout and whose lower end is flared outwardly at 2 to form a stop for a purpose presently explained, and whose bottom 3 and top 4 are perforated, the top 4 being hingedly connected at 5 to the body of the percolator and having a catch 6 adapted to spring over the lip 7 at the top of said body.

The tea leaves or coffee grounds are placed in the percolator and the lid closed. The closed percolator is then inserted in a tea or coffee pot containing hot water or the hot water may be poured into the pot after the insertion of the percolator. In any event, the hot water permeates the tea leaves or coffee grounds by reason of its admission to the container and properly and efficiently flavors the beverage.

My improved percolator is provided with a handle which is preferably of inverted U-shape comprising the bight portion 8 and legs 9, which are connected at their free ends to a band 10 adapted to slidably embrace the body 1 of the percolator. This band 10 normally rests upon the annular shoulder 2 of the body 1 and is prevented from moving beyond the bottom of the body by virtue of said shoulder 2. The band 10 has slidable engagement with the body 1, as stated, and is limited in its upward movement at the top of the body 1 by the guides 11 secured to the body 1 at the top thereof and through which guides 11 the legs 9 of the handle of the percolator slide and are guided.

The body 1 is provided with a strengthening rib 12 at its upper end which not only serves as a strengthening member but which also serves as a stop or rest for the lid 4, the lid 4 itself being strengthened by means of an annular rib 13, as clearly shown in the drawings.

By virtue of my adjustable handle my improved strainer or percolator is applicable to almost any size pot. If the pot is short the handle can be adjusted downward so that the handle is up far enough for any one to get hold of it with his fingers or with a fork or any other appliance. If the pot is narrow and long it can be adjusted clear up to the top. These various adjustments are permitted by virtue of the fact that the legs 9 of the handle are directed inwardly toward each other intermediate their ends, as indicated at 9' so that they will have tight frictional engagement with the sides of the body 1 in the guides 11.

One advantage in the use of my improved percolator is that when the tea or coffee is sufficiently strong the percolator or strainer which contains the leaves or grounds can be lifted out of the pot without making the tea or coffee too strong. If on the other hand the tea or coffee is not strong enough, the percolator or strainer may be replaced in the pot.

What is claimed is:—

1. A percolator comprising a receptacle whose body and bottom are perforated, the body flaring outwardly at its lower end to form a stop, a perforated lid for the body of the receptacle, guides on the body, a band embracing the body, an inverted U-shaped handle having its legs passed through said guides and connected to said band, the legs being directed inwardly toward each other intermediate their ends for tight frictional engagement with the sides of the body and said guide, whereby the handle may be adjusted to various positions with relation to the body.

2. A percolator comprising a receptacle whose body and bottom are perforated, the body flaring outwardly at its lower end to form a stop, a perforated lid for the body of the receptacle, guides on the body, a band embracing the body, an inverted U-shaped handle having its legs passed through said guides and connected to said band, the legs being directed inwardly toward each other intermediate their ends for tight frictional engagement with the sides of the body and said guide, whereby the handle may be adjusted to various positions with relation to the body, the body being provided with an internal annular rib at its upper end to strengthen the body and to form a support for the lid.

3. A percolator comprising a receptacle, guides on the receptacle, a band embracing the receptacle, and a handle including legs which pass through said guides and connect with said band, the legs being directed inwardly toward each other intermediate their ends for frictional engagement with the sides of said receptacle and said guides, whereby the handles may be adjusted to various positions with relation to the receptacle.

In testimony whereof I affix my signature in presence of two witnesses.

GEORGE MUELLER.

Witnesses:
ELVA A. LAUGHLIN,
JOHN T. REESE.